(12) United States Patent
Rao et al.

(10) Patent No.: US 6,395,804 B1
(45) Date of Patent: May 28, 2002

(54) POLYELECTROLYTE DISPERSANTS FOR HYDROPHOBIC PARTICLES IN WATER-BASED SYSTEMS

(75) Inventors: Prabhakara Satyauolu Rao, Maplewood; Ahmed Salih Abuelyaman; Babu N. Gaddam, both of Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/216,657

(22) Filed: Dec. 18, 1998

(51) Int. Cl.⁷ .................. C09D 11/10; C08F 2/38; C08F 28/02; C08L 41/00; C08L 33/14

(52) U.S. Cl. ............ 523/160; 523/161; 526/224; 526/287; 525/212

(58) Field of Search ............... 523/160, 161; 526/222, 224, 304, 307.2, 287; 525/212, 218

(56) References Cited

U.S. PATENT DOCUMENTS

| | | | | |
|---|---|---|---|---|
| 3,898,037 A | * | 8/1975 | Lange et al. ............ 422/16 |
| 3,960,824 A | * | 6/1976 | Hicks ............ 526/85 |
| 4,337,185 A | * | 6/1982 | Wessling et al. ........ 524/458 |
| 4,507,466 A | | 3/1985 | Tomalia et al. ........ 528/332 |
| 4,558,120 A | | 12/1985 | Tomalia et al. ........ 528/363 |
| 4,568,737 A | | 2/1986 | Tomalia et al. ........ 528/332 |
| 4,587,329 A | | 5/1986 | Tomalia et al. ........ 528/363 |
| 4,597,794 A | | 7/1986 | Ohta et al. ........ 106/20 |
| 4,631,337 A | | 12/1986 | Tomalia et al. ........ 528/391 |
| 4,694,064 A | | 9/1987 | Tomalia et al. ........ 528/332 |
| 4,713,975 A | | 12/1987 | Tomalia et al. ........ 73/865.8 |
| 4,737,550 A | | 4/1988 | Tomalia ........ 525/418 |
| 4,857,599 A | | 8/1989 | Tomalia et al. ........ 525/259 |
| 4,871,779 A | | 10/1989 | Killat et al. ........ 521/28 |
| 5,085,698 A | | 2/1992 | Ma et al. ........ 106/20 |
| 5,098,475 A | | 3/1992 | Winnik et al. ........ 106/23 |
| 5,120,361 A | | 6/1992 | Winnik et al. ........ 106/22 |
| 5,125,968 A | | 6/1992 | Takimoto et al. ........ 106/20 |
| 5,169,436 A | | 12/1992 | Matrick ........ 106/20 D |
| 5,184,148 A | | 2/1993 | Suga et al. ........ 346/1.1 |
| 5,254,159 A | | 10/1993 | Gundlach et al. ........ 106/22 H |
| 5,256,193 A | | 10/1993 | Winnik et al. ........ 106/21 A |
| 5,266,106 A | | 11/1993 | Winnik et al. ........ 106/22 K |
| 5,284,894 A | * | 2/1994 | Wasyliw et al. ........ 524/377 |
| 5,310,778 A | * | 5/1994 | Shor et al. ........ 524/556 |
| 5,399,642 A | * | 3/1995 | Emmons et al. ........ 526/224 |
| 5,418,301 A | | 5/1995 | Hult et al. ........ 525/437 |
| 5,545,504 A | | 8/1996 | Keoshkerian et al. ........ 430/137 |
| 5,554,213 A | | 9/1996 | Radigan, Jr. et al. ........ 106/22 H |
| 5,589,522 A | * | 12/1996 | Beach et al. ........ 523/160 |
| 5,596,027 A | | 1/1997 | Mead et al. ........ 523/161 |
| 5,679,762 A | * | 10/1997 | Yoshida et al. ........ 528/364 |
| 5,713,993 A | * | 2/1998 | Grezzo Page et al. ... 106/31.85 |
| 5,714,632 A | | 2/1998 | Rao et al. ........ 562/450 |
| 5,723,427 A | * | 3/1998 | Scherr et al. ........ 510/361 |
| 5,731,095 A | | 3/1998 | Milco et al. ........ 428/482 |
| 5,777,129 A | | 7/1998 | Juneau et al. ........ 548/455 |
| 5,780,551 A | | 7/1998 | Engel et al. ........ 525/236 |
| 5,788,749 A | | 8/1998 | Breton et al. ........ 106/31.6 |
| 5,807,971 A | | 9/1998 | Gozzini et al. ........ 528/332 |
| 5,821,283 A | * | 10/1998 | Hesler et al. ........ 523/161 |
| 5,830,948 A | | 11/1998 | Frechet et al. ........ 525/410 |
| 5,837,045 A | | 11/1998 | Johnson et al. ........ 106/31.85 |
| 5,840,106 A | | 11/1998 | Krepski et al. ........ 106/20 R |
| 5,851,274 A | | 12/1998 | Lin ........ 106/31.43 |
| 5,900,899 A | * | 5/1999 | Ichizawa et al. ........ 347/100 |
| 5,985,990 A | * | 11/1999 | Chen ........ 524/814 |
| 6,316,568 B1 | * | 11/2001 | Kohlammer et al. ........ 526/287 |

FOREIGN PATENT DOCUMENTS

| | | |
|---|---|---|
| EP | 0 722 994 A | 7/1996 |
| EP | 882772 * | 9/1998 |
| WO | WO 96/14925 | 5/1996 |
| WO | WO 97/43351 A1 | 11/1997 |
| WO | WO 97/49774 A2 | 12/1997 |

OTHER PUBLICATIONS

Perstorp Polyols Bulletin, p. 1, Jun. 1994.
Malmstrom, E., Johansson, M., and Hult, A., "Hyperbranched Aliphatic Polyesters", *Macromolecules*, vol. 28, No. 5, (Feb. 27, 1995), p. 1698–1703.
Spinelli, H. J., "Polymeric Dispersants in Ink Jet Technology", *Advanced Materials*, vol. 10, No. 15, (1998), p. 1215–1218.

* cited by examiner

*Primary Examiner*—Vasu Jagannathan
*Assistant Examiner*—Callie E. Shosho
(74) *Attorney, Agent, or Firm*—Melanie Gover (57) ABSTRACT

Dispersants that strongly adsorb to hydrophobic particles in aqueous media are described. The dispersants comprise one or more polyelectrolyte(s) and further comprise a hydrophobic hydrocarbon moiety. Suspensions and inks comprising the dispersants are also described.

24 Claims, 1 Drawing Sheet

POLYELECTROLYTE DISPERSANTS FOR HYDROPHOBIC PARTICLES IN WATER-BASED SYSTEMS

FIELD OF THE INVENTION

The present invention relates to dispersants for hydrophobic particles and particulate including pigments in water-based systems. In particular, the inventive dispersant can be used for pigments such as those useful as inks adapted for ink jet printing applications.

BACKGROUND OF THE INVENTION

When hydrophobic particles are placed in water they tend to agglomerate. This tendency makes it difficult to obtain a dispersion of hydrophobic particles in a water-based system. To lessen this agglomeration tendency, a dispersant may be added to the mixture. If the dispersant has both hydrophobic and hydrophilic parts, the hydrophobic part will be attracted to the hydrophobic particle surface and the hydrophilic part will be solvated by the water.

In recent years, the use of thermal ink jet printers in numerous applications has increased dramatically. Such printers make use of liquid-based inks which are sprayed onto a receptor, typically a sheet of paper or film, to produce an image. By using four basic ink colors (black, yellow, cyan, and magenta or black, red, blue and yellow) as well as white pigments (such as $TiO_2$) in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with ink jet and other printers are primarily comprised of dyes contained within organic-based carrier liquids. Although such inks may offer satisfactory performance in certain applications, the present trend is away from such systems, because such systems may tend to produce images that lack the light stability and durability required for outdoor and similarly demanding applications. Additionally, the use of organic-based carrier liquids may involve environmental and material-handling restrictions. The printing industry has sought inks that are primarily water-based to thereby reduce or eliminate restrictions associated with organic solvent-based systems.

Inks may comprise a suspension of pigment particles in a water-based carrier. However, the suspended pigments may tend to agglomerate. Because ink jet printers use very small jet nozzles (on the order of less than about 40 micrometers with droplet volumes on the order of picoliters) to provide high resolution images, pigment agglomerations may restrict or clog the printer heads. This effect is referred to herein as "plugging." Additionally, in the case of thermal ink jet systems, the ink is subjected to high temperatures (approximately 350° C.), as a result of the heating element in the nozzle. Typically inks tend to agglomerate faster at higher temperatures, and may also settle onto, and coat, the heating elements of the printer heads. This causes a decreased thermal efficiency of the print head, which results in the formation of smaller ink droplets and lower image quality. This effect is commonly referred to as "kogation."

To overcome the problems described above, pigment particles in some water-based ink jet inks have been stabilized from agglomeration with dispersants. In one approach, the dispersants were formed from surfactants having a hydrophilic portion as well as a hydrophobic portion, which hydrophobic portion adsorbs to pigment surfaces of varying hydrophobicity. In another approach, copolymers having hydrophilic segments and hydrophobic segments were used. Examples of these approaches are described in U.S. Pat. No. 4,597,794 and U.S. Pat. No. 5,085,698.

In the approaches described above, the hydrophobic segments of the surfactant or polymer can adsorb onto pigments by hydrophobic interaction between the dispersant molecule and the organic-based pigments whose surfaces tend to be hydrophobic. This hydrophobic interaction is usually not very strong. Because of this weak attraction, in thermal ink jet systems it is possible that the dispersant molecules can desorb from pigment surfaces, thereby allowing the pigment particles to agglomerate. During printing, this can result in plugging of the printer head jet nozzles. Although heat produced in a thermal ink jet system may strengthen the adsorption of the dispersant on the hydrophobic pigment surface, thus enhancing the stability of the ink, plugging and kogation remain a problem.

SUMMARY OF THE INVENTION

In view of the foregoing, a need exists for dispersants that strongly adsorb to hydrophobic particles and that inhibit particle agglomeration. A need also exists for water-based inks that offer increased stability. The present invention addresses such needs.

One aspect of the invention provides a dispersant for dispersing hydrophobic particles in an aqueous system comprising a hydrophobic segment comprised of a nonpolymerized hydrocarbon moiety joined to at least one terminal polymeric hydrophilic segment comprised of a polyelectrolyte.

Another embodiment of the invention relates to stable water-based systems in which an inventive dispersant is incorporated into a water-based dispersion of particles, the particles having hydrophobic surfaces. Such systems comprise, generally, an aqueous suspension of a) hydrophobic particles, and b) a dispersant comprising a hydrophobic segment comprised of a nonpolymerized hydrocarbon moiety, which can adsorb to hydrophobic particle surfaces, joined to at least one terminal polymeric hydrophilic segment comprised of a polyelectrolyte.

An alternate embodiment of the invention provides a dispersant wherein the hydrocarbon moiety has two opposite ends and wherein a polyelectrolyte is attached to each end of the hydrocarbon moiety.

Another embodiment of the invention provides a mixture of linear hydrophobe-terminated hydrophilic copolymers and multibranched hydrophilic copolymers.

A particular application of the present invention relates to stable water-based pigmented inks that meet the stringent requirements of ink jet and other printing applications. In these inks, an inventive dispersant is incorporated into a water-based pigment dispersion to inhibit agglomeration of the hydrophobic pigment particles.

Figure 2:
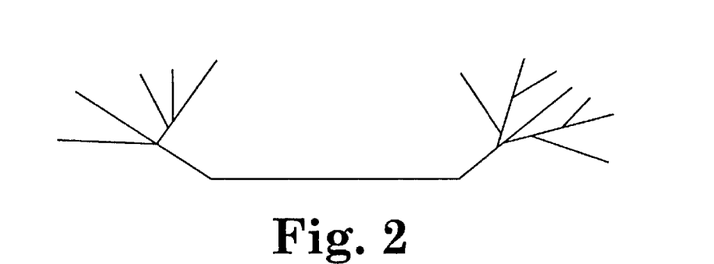
FIG. 2 is a line drawing that generally illustrates a dispersant according to the invention having a branched hydrophilic polyelectrolyte segment on each end of a linear long chain aliphatic hydrophobic segment.
Figure 3:
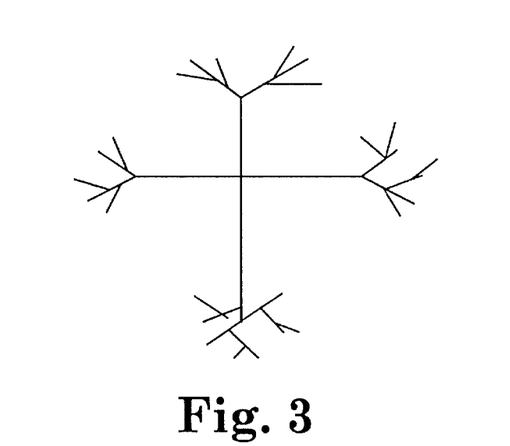
FIG. 3 is a line drawing that generally illustrates a dispersant according to the invention having a branched hydrophilic polyelectrolyte segment terminating each branch of a branched aliphatic hydrophobic segment.

As used in this invention:

"adsorb" refers to the adherence of an atom, ion, or molecule to the surface of another substance;

"dispersant/particle composite" means a dispersant molecule and the particle or particulate to which the dispersant is adsorbed; typically the composite will comprise layers of dispersant molecules on the particle or particulate;

"aliphatic group" or "aliphatic moiety" "long chain aliphatic group/moiety" means a linear, branched, cyclic, substituted or unsubstituted, non-polar hydrocarbon having approximately 6 to 100, preferably 8 to 20, carbon atoms;

"aromatic group" or "aromatic moiety" means a nonpolar hydrocarbon, having approximately 6 to 100, preferably 8 to 20, carbon atoms, comprising at least one cyclic structure containing at least one π-conjugated ring structure;

"hydrocarbon group" or "hydrocarbon moiety" means an aliphatic or aromatic group; "banding" refers to visible striations or lines of lower optical density that can occur when an ink is printed on a substrate;

"ionizable" means a neutral molecule comprising atoms capable of losing or gaining electrons, thereby acquiring a net electrical charge and forming an ion, e.g., when in a polar medium such as water;

"polyelectrolyte," "polyelectrolytic," "electrolytic" means an oligomer, polymer, or copolymer containing ionic constituents wherein an aqueous solution of the oligomer or (co)polymer will conduct an electric current;

"oligomer" means a polymer having approximately 10 to 50 monomer units;

"random copolymer" means a copolymer comprised of at least two types of monomer units, e.g., A and B, wherein the order of a combination of monomeric units is random;

"hydrophilic segment" means the portion(s) of the dispersant, distinct from the hydrophobic portion of the dispersant, that comprises a polymer of water-soluble moieties;

"hydrophobic segment" means the portion of the dispersant molecule, distinct from the hydrophilic portion of the dispersant, that is comprised of water-insoluble, nonpolar moieties, which hydrophobic portion can associate or bond with the surface of a hydrophobic particle; the hydrophobic segment is not polymerized, but rather derived from a single aliphatic or aromatic precursor, e.g., octadecyl isocyanate;

"hydrophobic particle" means a particle that is nonpolar or has a nonpolar surface;

"solvate" refers to the phenomenon wherein a strong affinity of a solvent, e.g., water, for particles of dissolved or suspended substances leads to the particles acquiring a tightly held film of solvent on their surfaces;

"terminal" means that if the dispersant comprises more than one hydrophilic segment, the hydrophilic segments always constitute end groups of the hydrophobic segment; such structures are exemplified by FIGS. 2 and 3; and "water soluble" refers to a material capable of being homogeneously distributed in water, such as a material that will form an aqueous solution or dispersion.

Further aspects of the invention will become apparent with reference to the following figures and detailed description.

DETAILED DESCRIPTION

The water-soluble dispersants of the present invention comprise one or more water-soluble polyelectrolyte(s). The polyelectrolyte may comprise a hydrophilic homopolymer or a hydrophilic random copolymer wherein the monomer comprising the homopolymer, and at least one monomer comprising the copolymer, is ionizable. The dispersants further comprise a nonpolar nonpolymerized hydrophobic hydrocarbon segment, which hydrophobic segment can adsorb to a particle having a hydrophobic surface. Although the dispersants contain water-insoluble segments, the dispersants are water-soluble, i.e., they will form aqueous dispersions.

When added to a dispersion system, the hydrophilic segment(s) of the dispersant, which segment(s) can be of variable length, provide(s) steric and electrostatic stabilization to the dispersion, while the hydrophobic segment provides adsorption (anchoring) of the dispersant to a hydrophobic particle surface.

The steric and electrostatic stabilization provided by the hydrophilic segment(s) results from a strong mutual repulsion between individual dispersant/particle composites. These repulsive forces are due to the hydrophilic segment containing ionic functional groups, which cause each dispersant/particle composite to become effectively highly charged. The ionic groups can be cationic or anionic, but typically should all have the same type of charge. The like charges cause the composites to repel each other, thereby inhibiting particle flocculation. As discussed above, resistance to particle flocculation is desired to counteract the high thermal energy generated during ink jetting, which energy can cause frequent and energetic particle interactions, leading to flocculation. Reduction of particle flocculation is further desired because flocculation can decrease ink dispersion stability and shelf-life. The repulsive forces can help provide dispersion stability for an extended period of time, e.g., at least one year.

The hydrophilic polyelectrolyte segment(s) of the dispersant may be linear or branched. The polyelectrolyte(s) comprise at least one ionizable monomeric component, such as an acid group, and are electrolytic in an aqueous medium. Examples of suitable monomeric materials that can provide electrolytic and ionizable moieties include, but are not limited to, for example, acrylic acid, 2-acrylamido-2-methyl-1-propanesulfonic acid (AMPS), salts of sulfopropyl acrylate, maleic anhydride, itaconic anhydride, β-carboxy ethylacrylate, vinylazlactone-glycolic acid adduct, sodium styrene sulfonate, or combinations of these materials.

A chain transfer agent (CTA) having two or more functional groups can be used to join the hydrophilic and hydrophobic segments of the dispersant molecule. The CTA controls the length of the polymeric hydrophilic polyelectrolyte segment. The amount of CTA reacted with the precursor materials that will form the hydrophilic segment(s) may be varied to alter the length of the polymeric hydrophilic segment. Increasing the concentration of CTA will cause a shorter chain length. After the CTA has reacted with, and terminated the polymerization of, the polymeric hydrophilic segment, unreacted functional group(s) on the chain transfer agent may be reacted with reactive hydrophobic moieties, which will form the hydrophobic segment of the dispersant.

This second step of reacting the CTA functional group(s) with hydrophobic reactants can be eliminated if the chain transfer agent itself is a hydrophobic segment precursor comprising an aliphatic or aromatic moiety. The dispersants of the invention preferably are prepared by chain terminating a hydrophilic polyelectrolyte with such hydrophobic chain transfer agents. This method allows the synthesis of dispersants containing multiple branches having terminal polyelectrolytes by using multifunctional chain transfer agents.

Figure 1:
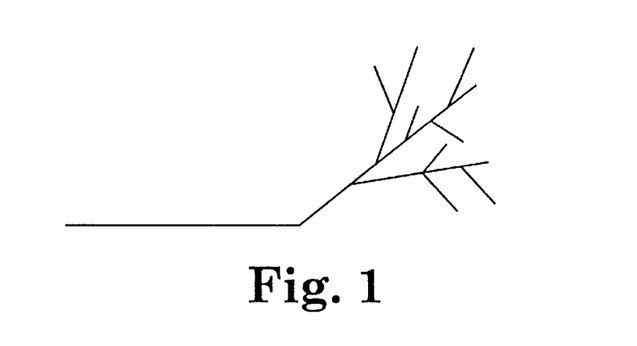
FIG. 1 is a line drawing that generally illustrates a dispersant according to the invention having a single branched hydrophilic polyelectrolyte segment and a linear long chain aliphatic hydrophobic segment.

Examples of suitable mono-functional chain transfer agents comprising aliphatic or aromatic chains include alkyl-substituted phenyl mercaptans, allyl-terminated alkanes, alkyl mercaptonaphthalenes, alkyl mercaptothiophenes, or combinations of these materials. Other monofunctional CTAs include, for example, terminal bromo-substituted alkanes such as octylbromide, 1,1-dibromo octane, and 1,1,1-tribromo octadecane. Examples of these materials include isooctyl mercaptopropionate, n-tetradecylmercaptan, n-octyl mercaptan, n-tetradecyl bromide, n-octylbromide, and alkyl halides. These CTAs yield structures of the type shown in FIG. 1.

Examples of multi-functional chain transfer agents include trimethylolpropane tri(3-mercaptoproprionate), pentaerythritol tetra(3-mercaptoproprionate) or combinations of these materials. The multi-functional CTAs can also be derived from $\alpha$, $\omega$-mercaptoalkanes or $\alpha$, $\omega$- allyl alkanes. The examples include, but are not limited to, 1,10-dimercaptodecane, 1,14-dimercapto tetradecane, 1,10-diallyl decane. Other CTAs comprise $\alpha$, $\omega$-halogen substituted alkanes. For example, ($\alpha,\alpha,\alpha$, $\omega,\omega,\omega$-hexabromo) decane. These provide the types of dispersants shown in FIGS. 2 and 3.

The hydrophobic reactants, including chain transfer agents carrying hydrophobic hydrocarbon chains, preferably provide approximately 6 to 100, preferably 8 to 20, total carbon atoms per group, and are preferably aliphatic. The hydrocarbon groups may be linear or branched, unsubstituted or substituted, as long as the substituent is nonpolar.

The hydrophobic segment provides strong hydrophobic adsorption of the dispersant to hydrophobic particle surfaces. In general, the degree of hydrophobic interaction achievable by the dispersant with hydrophobic particles depends on the number of hydrophobic functional groups, such as methylene or aromatic groups, available on the hydrophobic segment of the dispersant that can spread on the surface of each hydrophobic particle.

The hydrophobic segments and their functional group(s) may be selected to tailor the physico-chemical properties of the resulting dispersant to the needs of the particular dispersion that is to be stabilized. The number of carbon atoms in the hydrophobic segment may be controlled and may be chosen to maximize particle adsorption without compromising overall water solubility of the dispersant. For example, greater solubility for the dispersant may be achieved by shortening the length of the hydrocarbon group.

The relative amount of hydrophilicity and hydrophobicity in the dispersant may also be controlled by varying the number of hydrophilic polyelectrolytes attached to the hydrophobic segment. The number and location of polyelectrolytes on the dispersant is determined by, e.g., the number, location, and type of reactive chain terminating functional group(s) on the hydrophobic hydrocarbon moieties. In general, any structure could work so long as the placement of the hydrophilic segments does not interfere with the concentration or degree of hydrophobicity necessary to interact with the hydrophobic particle and so long as the hydrophilic segment(s) is sufficiently ionic and solvated to keep the dispersant/particle composite dispersed in an aqueous system.

The molecular weight of the dispersant molecule may be up to 100,000, preferably 50,000, more preferably below 25,000 and most preferably in the range of 15,000 to 35,000.

The design and synthesis of the dispersant will preferably ultimately result in a stable colloidal dispersion of particle/dispersant composites having diameters of less than 250 nanometers (nm), preferably less than 200 nm and most preferably 100 to 150 nm.

Functional groups on the reacting materials that are not directly involved in the reaction steps forming the dispersant compounds may be further reacted to meet desired physico-chemical property requirements of the final dispersants. This allows for the formation of tailored dispersants.

Preparation of the dispersant is typically carried out as a thermal, free-radically initiated process. Examples of suitable thermally-activated free radical initiators include azo initiators such as those available under the trade name VAZO 52 from DuPont Chemical Co., Wilmington, Del. and azo initiators available under the WAKO trade name from Wako Chemicals USA, Richmond, Va.

Dispersants of this invention prepared by using mono-functional mercaptans as the hydrophobic chain transfer agent preferably include:

a) n-Dodecyl-terminated Poly (AMPS-co-N,N-Dimethylacrylamide)
b) n-Octyl-terminated Poly (AMPS-co-N,N-Dimethylacrylamide)
c) n-Tetradecyl-terminated Poly (AMPS-co-N,N-Dimethylacrylamide)
d) n-Dodecyl-terminated Poly (AMPS-co-Sulfopropyl acrylate, K-Salt)
e) n-Octyl-terminated Poly (AMPS-co-Sulfopropyl acrylate, K-Salt)
f) Tetradecyl-terminated Poly (AMPS-co-Sulfopropyl acrylate, K-Salt)
g) t-Dodecyl-terminated Poly (AMPS-co-N,N-Dimethylacrylamide) (t-Dodecane is a mixture of Isomers)
h) t-Dodecyl-terminated Poly (AMPS-co-Sulfopropyl acrylate, K-salt)
i) 1-Dodecyl-terminated Poly (AMPS-co-Sulfopropyl acrylate, K-salt)
j) Octadecyl-terminated Poly (AMPS-co-Sulfopropyl acrylate, K-salt )
k) n-Teteradecyl-terminated Poly (AMPS-co-Sulfopropyl acrylate, K-salt)
l) Isooctyl-terminated Poly (AMPS-co-N,N-Dimethylacrylamide)

Dispersants of the present invention may also comprise compositions comprising mixtures of the linear hydrophobe-terminated hydrophilic copolymers noted as (a) through (1) above with multi-branched hydrophilic (co)polymers obtained by chain termination using multifunctional chain transfer agents described above. Dispersant mixtures useful in the invention can be prepared, for example, by the copolymerization of AMPS and NNDMA in the presence of both a branched chain transfer agent (e.g., pentaerythritol tetra(3-mercaptoprionate) and a linear chain transfer agent (e.g., n-octyhnercaptan). Without wishing to be bound by theory, it is to be expected that the resulting mixture would contain polymer chains terminated by n-octylthiol groups mixed with a mixture of pentaerythritol tetra(3-mercaptoproprionate) core molecules bearing a statistical distribution of 1, 2, 3, and 4 polymer chains that have been terminated by reaction with 1, 2; 3 or 4 terminal thiol groups of the pentaerythritol tetra(3-mercaptoproprionate) molecule. Useful properties of dispersant mixtures of this type can be controlled according to the amount of each chain transfer agent present. For example, since the linear copolymer (the n-octylmercaptyl-terminated copolymer) comprises the only copolymer having a hydrophobic portion, a higher proportion of this constituent can result in an increased number of molecules bound to hydrophobic particles that are to be dispersed.

Dispersant mixtures were prepared as follows:

m) copolymerization of AMPS and NNDMA in the presence of a 2.5:1 weight ratio of trimethylolpropane tri(3-mercaptopropionate) and octyl mercaptan;

n) copolymerization of AMPS and sulfopropyl acrylate potassium salt in the presence of a 2.5:1 weight ratio of trimethylolpropane tri(3-mercaptopropionate) and octyl mercaptan;

o) copolymerization of AMPS and sulfopropyl acrylate potassium salt in the presence of a 2:1 weight ratio of pentaerythritol tetra(3-mercaptopropionate) and octyl mercaptan; and p) copolymerization of AMPS and NNDMA in the presence of a 2:1 weight ratio of pentaerythritol tetra(3-mercaptopropionate) and octyl mercaptan.

Ink Systems

The dispersants of the present invention have applicability as pigment dispersants in ink jet, and other printing, inks. The inks of the present invention may be formed with a variety of pigments. In particular, the inventive inks may be provided with black, cyan, yellow, magenta, red, blue, green, and white pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the colors discussed above. Rather, inks employing any pigment or combination of pigments compatible with electronic graphic image systems may be used.

For black inks, carbon black may be used as the black pigment. The selection of carbon blacks suitable for use with the present invention is based primarily upon considerations of surface oxidation, and the degree of blackness (also called jetness) of the pigment. Pigments that are acidic or surface-treated provide suitable interaction sites for strong dispersant adsorption. Pigments with a high degree of blackness or jetness provide a high quality printed image.

For yellow inks, the use of nickel azo yellow pigment offers several advantages. First, such pigments provide inks that are highly durable in outdoor environments. Second, such pigments contain nickel ions, which may be able to form complex bonds with the novel dispersants. Lastly, such pigments are believed to offer a high degree of thermal conductivity. As a result, if particle deposition onto a heater element does occur during the jetting process, the deposited film will not significantly reduce the heating efficiency of the ink, thereby allowing proper bubble formation.

For magenta inks, a primary consideration is lightfastness, since it is very desirable to produce graphic images that are adapted to outdoor applications. Quinacridone magenta pigment is known to have excellent lightfastness, and therefore, is one preferred magenta pigment.

For cyan inks, the considerations above, (i.e., lightfastness, durability, etc.), apply as well. As a variety of satisfactory properties may be found using copper phthalocyanine as a cyan pigment, inks comprising such pigments are one preferred embodiment.

Dispersant Selection: Because pigment particles are typically devoid of surface functional groups to provide bonding sites for a dispersant, a dispersant preferably comprises a hydrophobic portion to interact with the hydrophobic solid pigment surface in an aqueous environment. The dispersants of this invention provide hydrophobic moieties to interact with pigment particles. The one or multiple hydrophilic segment(s) can provide effective electrostatic and steric stabilization to the colloidal pigment dispersion. Stability of the dispersion is also enhanced if the dispersant-particle attraction is stronger than the particle-particle attraction, especially at high temperatures.

Usually a pigment particle does not carry a single dispersant molecule, but rather multiple layers of dispersant molecules. This occurs because when a dispersant's hydrocarbon moiety adsorbs to the particle it facilitate the adsorption of a second dispersant molecule and this will continue until an equilibrium thickness of the adsorbed dispersant layer is reached.

Compatibility between the dispersant, pigment, and other components of the ink must also be considered. The dispersants used for different colored pigments that will be applied to the same receptor surface should preferably be thermodynamically miscible and should possess the same kind of ionic charge to prevent coagulation of the inks when deposited on the receptor surface.

Secondary dispersant(s) may also be used to enhance the stabilizing effect of the dispersants of this invention, when they are used as primary dispersants.

Inks: In addition to the pigments and dispersants described above, inks preferably comprise water as a medium in which pigments can be dispersed. Such inks will typically also include further additives to provide various properties. For example, a polyol may be employed to control the drying rate of the ink. Suitable polyols include, for example, polyalkylene glycols such as polyethylene glycol and polypropylene glycol; alkylene glycols whose alkylene group has 2–6 carbon atoms, such as ethylene glycol, propylene glycol, butylene glycol, triethylene glycol, 1,2,6-hexanetriol, hexylene glycol, and diethylene glycol; glycerol; and lower alkyl ethers of alcoholic polyols such as ethylene glycol monomethyl or monoethyl ether, diethylene glycol methyl or ethyl ether, and triethylene glycol monomethyl or monoethyl ether. Diethylene glycol is the most preferred polyol. A surfactant, useful for wetting the pigment and reducing the surface tension of the ink system, can be provided as well. In addition to the above, other ink additives commonly known in the art may also be used. These include, water-soluble organic cosolvents, humectants (in addition to the above-named polyols), biocides, fingicides, defoamers, corrosion inhibitors, viscosity modifiers, pH buffers, penetrants, sequestering agents, and the like.

Ink Processing: Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity microshearing and cascading which breaks down agglomerations of the pigment particles. However, media mill processing systems often suffer from disadvantages including media wear product contamination. Additionally, if the flow rate in a media mill is raised beyond a certain level, the resulting grinding and dispersion becomes uneven, and much of the material leaves the system without being sufficiently processed.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks.

In the present invention, the pigmented ink formulation comprising the pigment, the dispersant, auxiliary surfactant, water, DEG, and other additives is first subjected to mixing under high shear conditions in a Hill mixer (Model # 4000 Plus, AC drive), available from Hill Mixer, Inc., Paterson, N.J., which is a high speed impingement homogenizer comprising a spiral propeller with a "grapefruit style" head for greater suction through the head from the propeller. The shear mixing was done at moderate speeds of approximately 2000 rpm. In some cases, after dilution to a 15 to 25 weight % solids concentrate, the ink was subjected to fine particle grinding by an "impinging jet" process generally as described in PCT Publication WO 96/14925. The processed concentration was typically diluted to 4% solids with DEG/water mixtures having DEG:water weight ratios of 20:80 to 12.5:87.5, preferably 12.5:87.5.

EXAMPLES

This invention may be illustrated by way of the following examples.

Test Methods
Molecular Weights of Dispersants

The molecular weights of dispersants were determined by elution using a gel permeation chromatograph available under the trade name ULTRAHYDROGEL from Waters Corp., Milford, Mass. Linear 1000, 500 and 250 columns were used with an elution solution comprising a 0.1M Tris amine buffer (Tris hydroxymethylamino methane) plus 0.2M Li $NO_3$ and monitoring by a refractive index detector available under the trade name HP 1037A from Hewlett Packard Instruments, Palo Alto, Calif. Molecular weight calculations were based on a calibration made using polyethylene glycol (PEG) and polyethylene oxide (PEO) standards of molecular weight ranges from $2.8 \times 10^5$ to 200.

Thermal Stability

All the processed inks were brought to a strength of 4 weight % solids unless noted otherwise. The solids include the pigment, surfactant, and any other nonvolatile additives such as an auxiliary dispersant. The ink obtained after processing and filtration was poured into a glass vial (8.9 cm long×2.54 cm diameter), which was covered with a loosely fitting metal cap to help retain most of the liquid (typically 12.5 weight % diethylene glycol (DEG) in water) in the ink. The was left undisturbed in an oven at 60° C. to 65° C. for 1 week (unless otherwise noted). If no solids separation occurred at 60° C. the ink was considered to be thermally stable. If visual inspection revealed no coagulation nor even a small layer of separated solids floating on the ink, the vial was transferred to a 120° C. oven and inspected after at least two days to see if any solids separation occurred. If the ink showed no solids separation after 2 or more days at 120° C., it was considered to be highly stable.

Quality of Prints on Encad NOVAJET III Printer

The inks were printed onto a vinyl receptor sheet available under the trade name SCOTCH-CAL from 3M Co., St. Paul, Minn., using a thermal ink jet printer available under the trade name NOVAJET III from Encad, Inc, San Diego, Calif. In preparation for printing, the printheads were cleaned, the printer was checked for leaks, and the cartridges were filled with the ink to be tested. The quality of prints were judged visually, upon repeated trials, for uniformity of color over large format blocks (30 cm×90cm), absence of banding, and adhesion to the substrate.

All materials mentioned in these examples are available from Aldrich Chemical Co., Milwaukee, Wis., unless otherwise noted.

Synthesis of Dispersants
Dispersant A
n-Octyl-mercaptyl-terminated Poly(2-acrylamido-2-methyl-1-propanesulfonic Acid-co-potassium Sulfopropyl Acrylate)

Seventy-five grams (g) of 2-acrylamido-2-methyl-1-propanesulfonic acid (AMPS), and 75 g of potassium sulfopropyl acrylate were dissolved in a mixture of 400 g of dimethyl formamide (DMF) and 100 g of water. After flushing the monomer mixture with nitrogen for 20 minutes at a rate of 50 bubbles/min, 1g of n-octanethiol, available from Evans Chemetics, Hampshire Chemical Corp., Lexington, Mass., was dissolved in the monomer mixture along with 7 g of an azo thermal initiator available as VAZO 52 from DuPont Chemical Co., Wilmington, Del. The container holding the monomer solution was mechanically shaken for 36 hours at 55° C. The resulting polymer solution was added to 2 liters of acetone to precipitate the polymer. The polymer was then washed with two increments of approximately 300 milliliter of acetone. After the solvent was removed by decantation, the remaining solids were dried and dissolved in water to obtain a 30 to 35 weight % solution.

Dispersant B
Isooctyl-mercaptyl propionyl-terminated Poly(2-acrylamido-2-methyl-1-propanesulfonic Acid-co-potassium Sulfopropyl Acrylate)

Dispersant B was made in the same manner as Dispersant A except that 1.5 g of isooctyl mercaptopropionate was used in place of n-octanethiol.

Dispersant C
n-Tetradecyl-3-mercaptyl isooctylpropionate-terminated Poly(2-acrylamido-2- methyl- 1 -propanesulfonic acid-co-N,N-dimethylacrylamide (NNDMA))

60 g of AMPS and 30 g of NNDMA were dissolved in a mixture of 150 g of DMF and 150 g of acetonitrile. After flushing the solution with nitrogen for 20 minutes at a rate of 50 bubbles/min, 1.37 g of n-tetradecyl mercaptan, followed by 3.75 g of VAZO 52 initiator, were dissolved in the solution. The container holding the monomer solution was mechanically shaken for 36 hours at 55° C. The resulting polymer solution was added to 1.5 L of acetone to precipitate the polymer. The polymer was then washed with two increments of approximately 300 mL of acetone. The solvents were removed by decantation. The resulting polymer was dried and dissolved in water to obtain a 30 to 35 weight % solution.

Dispersant D
Mixture of Trimethylolpropane tri(3-mercaptopropionate)-terminated Poly (AMPS-co-NNDMA) and n-octyl Mercaptan-terminated Poly(AMPS-co-NNDMA)

20 g of AMPS and 10 g of NNDMA was dissolved in 100 g of 1:1 weight ratio mixture of DMF and acetonitrile and flushed with nitrogen for 20 minutes at a rate of approximately 50 bubbles/minute. Then 0.28 g of trimethylolpropane tri(3-mercaptopropionate) and 0.04 g of n-octyl mercaptan were added (providing a 2.5 to 1 weight ratio of multi- to mono-functional chain transfer agents), followed by 1.24 g of VAZO 52 initiator. The homogeneous solution was shaken in a thermostatted water bath for 36 hours at 55° C. to obtain the polymer mixture. The mixed polymer solution was added to 500 mL of acetone to precipitate the polymer. The precipitate was then washed with two increments of approximately 100 milliliters of acetone. The solvents were removed by decantation and the polymer mixture was dried and dissolved in water to obtain an approximately 30 weight % solution.

It is postulated that the dispersant comprised a mixture of at least two structures: (1) trimethylolpropane tri-(3-mercaptopropionate)-terminated (poly(AMPS-co-NNDMA)) and (2) n-octyl-terminated(poly(AMPS-co-NNDMA)). The monofunctional n-octyl mercaptan-terminated chain is believed to provide the hydrophobic segment with which a hydrophobic particle can interact. The hydrophilic multifunctional copolymers are believed to provide added electrostatic and steric stability to a dispersion. The monofunctional chain is also believed to dilute the concentration of multifunctional copolymers thereby decreasing molecular entanglement or crosslinking of the multifunctional copolymer, which entanglement or crosslinking can cause insoluble network (gel) formation.

Dispersant E
Mixture of Trimethylolpropane Tri-(3-mercaptopropionate)-terminated poly(AMPS-co-potassium Sulfopropyl Acrylate) and n-octyl Mercaptan-terminated poly(AMPS-co-potassium sulfopropyl Acrylate)

Dispersant E was made in the same manner as Dispersant D except the monomer compositions were changed to: 12.5 g of AMPS (instead of 20 g); 12.5 g of potassium sulfopropyl acrylate (instead of 10 g of NNDMA); 0.23 g of trifunctional mercaptan (instead of 0.28 g); and 0.024 g of monofunctional mercaptan (instead of 0.04 g) (providing a 2.5 to 1 weight ratio of multi- to mono- functional chain transfer agents).

The same general postulate for Dispersant D also applies for Dispersant E.

Dispersant F
Mixture of Pentaerythritol Tetra (3-mercaptopropionate)-terminated poly(AMPS-co-potassium sulfopropyl acrylate) and n-octyl Mercaptan-terminated Poly(AMPS-co-potassium sulfopropyl acrylate)

12.5 g of AMPS and 12.5 g of potassium sulfopropyl acrylate were dissolved in a mixture of 75 g of DMF and 25 g of water. The resulting solution was flushed with nitrogen for 20 minutes at a rate of 50 bubbles/min. Then 0. 19 g of pentaerythritol tetra-(3-mercaptopropionate) and 0.28 g n-octyl mercaptan were added (providing a 2 to 1 weight ratio of multi- to mono- functional chain transfer agents), followed by 1.24 g of VAZO 52 initiator. After all the solids were dissolved and the solution appeared homogeneous, polymerization occurred as the solution was shaken at 55° C. for 2 hours. The polymer isolated by precipitation in acetone, dried and dissolved in water in the same manner as Dispersant D.

It is postulated that the dispersant comprised a mixture of at least two structures: (1) pentaerythritol tetra (3-mercaptopropionate)-terminated poly(AMPS-co-potassium sulfopropyl acrylate) and (2) n-octyl mercaptan-terminated poly(AMPS-co-potassium sulfopropyl acrylate). The monofunctional n-octyl mercaptan-terminated chain is believed to provide the hydrophobic segment with which a hydrophobic particle can interact. The hydrophilic multifunctional copolymers are believed to provide added electrostatic and steric stability to a dispersion. The monofunctional chain is also believed to dilute the concentration of multifunctional copolymers thereby decreasing molecular entanglement or crosslinking of the multifunctional copolymer, which entanglement or crosslinking can cause insoluble network (gel) formation.

Dispersant G
Mixture of Pentaerythritol Tetra-(3-mercaptopropionate)-terminated Poly (AMPS-co-NNDMA) and n-octyl Mercaptan-terminated Poly(AMPS-co-NNDMA)

Dispersant G was made in the same manner as Dispersant F except (1) the monomer compositions were: 20 g of AMPS; 10 g of NNDMA; 0.322 g of pentaerythritol tetra (3-mercaptopropionate), and 0.0483 g of n-octylmercaptan (providing a 2 to 1 weight ratio of multi- to mono- functional chain transfer agents); (2) the solvent mixture was a 100 g solvent mixture of 1:1 DMF/acetonitrile and (3) polymerization conditions for the homogeneous solution were 36 hours at 55° C. using 1.2 g of VAZO 52 initiator.

The same general postulate for Dispersant F also applies for Dispersant G.

Dispersant H
n-Octadecyl-mercaptyl-poly(AMPS-co-NNDMA)

Dispersant H was made in the same manner as Dispersant A except: 20 g of AMPS were used (instead of 75 g), 10 g of NNDMA were used (instead of 75 g of potassium sulfopropyl acrylate), 50 g of dimethyl formamide were used (instead of 400 g), 50 g of acetonitrile were used (instead of 100 g of water), 0.69 g of n-octadecylmercaptan was used (instead of 1 g of n-octanethiol), and 1.24 g of VAZO 52 were used (instead of 7 g).

TABLE 1

Molecular Weight Data of Some Alkyl-terminated Polyelectrolytes

| Dispersant | Mn | Mw | P |
| --- | --- | --- | --- |
| A) | 18,400 | 31,000 | 1.7 |
|  | (17,800) | (35,000) | (1.99) |
| C) | 14,600 | 22,500 | 1.54 |
| D) | 19,700 | 36,400 | 1.85 |
| F) | 10,000 | 15,600 | 1.56 |
| G) | 16,000 | 28,500 | 1.78 |

The values in parentheses are for a repeat preparation of the dispersant
wherein Mw=mean weight average molecular weight, Mn=mean number average molecular weight and P=polydispersity.

Formulations of Ink

To evaluate the efficacy of the dispersants, a generalized procedure was adopted to prepare the pigmented inks. A pigment was typically dispersed in an aqueous solution of diethylene glycol (DEG) in the presence of an auxiliary surfactant and the dispersant. Usually, the pigment to dispersant weight ratio was from 3:2 to 3:1. An auxiliary surfactant was added to adjust the surface tension of the ink, assist in its jettability through the printer nozzle, and wet the receptor surface. The surfactant may also provide added stability to the dispersion system. Hyperdispersants designed to wet the pigment surface were optionally included. Diethylene glycol served as a humectant.

Grinding of the Ink

The ingredients corresponding to each ink formulation, withholding approximately 10% of the quantity of water to be used, were mixed at ambient temperature and pressure under high shear conditions in a Hill mixer (Model # 4000 Plus, AC drive), available from Hill Mixer, Inc, Paterson, N.J., which is a high speed impingement homogenizer-mixer comprising a spiral propeller with a "grapefruit style" head for greater suction through the head from the propeller. The mixer motor is of 1 HP with a capacity of 10,000 rpm. Speeds of the propeller up to approximately 2,000 rpm (in forward or reverse) were used for grinding. The water that was withheld was used to rinse the mixer and collect any adhering ink concentrate after the grinding operation.

The resulting concentrate was preferably 15 to 20 weight % solids to avoid forming high viscosity pastes, which are difficult to grind.

The inks of EXAMPLES 3–6 were prepared by the above-mentioned Hill mixer grinding process only and were not filtered. The inks of EXAMPLES 1 and 2 were obtained by processing the inks in two steps: first by the Hill mixer grinding and then subjecting the concentrates to a jet impingement process wherein the ink is jetted at high speeds through nozzles of a few microns in diameter. This jet impingement process shears pigment agglomerates to smaller aggregates, which take up additional quantities of the dispersant as a result of increased surface area produced by deagglomeration.

EXAMPLE 1

(Magenta Ink)

One hundred grams of a quinacridone magenta pigment available under the trade name SUNFAST Magenta Presscake 122; 428-0010 (32% solids) from Sun Chemical Co., Cincinnati, Ohio., was suspended in a mixture of 44.6 g of diethylene glycol (DEG) and 100 g of water. Five grams of a nonionic aromatic ethoxylate polymeric hyperdispersant available under the trade name SOLSPERSE 27000 from Zeneca Pigments and Additives, Blackley, Manchester, England, were added, followed by 4 g of an alkaryl polyether alcohol surfactant available under the trade name TRITON X-100 from Union Carbide Plastics Co., Gary, Ind. The mixture was subjected to high speed grinding in a Hill mixer available from Hill Mixer, Inc., Paterson, N.J., for 2 hours at approximately 2000 rpm. Then 65 g of a 33.1 weight % solution of Dispersant A (22.1 g solids) were added to the pigment suspension and high speed grinding was continued for another hour. An additional 100 g of water was added during grinding to obtain an approximately 15 weight % solids concentrate. The ink concentrate was then subjected to fine-particle grinding in an impinging jet process generally as described in the PCT Publication WO 96/14925 for 60 to 90 minutes. The resulting concentrate was filtered through a 0.5 to 1.0 $\mu$m filter, such as a Whatman Polycap 36 HD cartridge type filter, available from Arbor Technology, Ann Arbor, Mich. and further diluted with a 12.5:87.5 DEG: water mixture to an approximately 4 weight % solids ink.

The ink was thermally stable at 60° C. and 120° C.

The particle size of the pigment particles in the ink, as measured by a submicron particle analyzer, available under the trade name Coulter N+from Coulter Corp., Hialeah, Fla., ranged between 100 and 150 nanometers.

The ink was jetted through the printheads of an Encad NOVAJET III wide format printer onto a SCOTCHCAL receptor sheet to yield 30 cm×90 cm magenta prints exhibiting uniform color, no banding, and adhesion to the substrate. The printing was conducted intermittently over a two day period.

EXAMPLE 2

(Magenta Ink)

This example incorporates a secondary codispersant comprising dendritic polymer having at least one peripheral ionizable moiety and at least one peripheral hydrocarbon moiety, as disclosed in copending application U.S. Ser. No. 09/216,165 (Attorney Docket No. 54279USA1A), which is incorporated by reference. In this particular example, a 3-generation functionalized hyperbranched polymer secondary dispersant was used.

200 g of a 3-Generation hyperbranched polyester polyol (Mw of 3570; OH functionality of 32) available under the trade name BOLTORN H30 from Perstorp Polyol Inc., Toledo, Ohio., and 1 weight % of p-toluenesulfonic acid were placed in a 3-neck reactor equipped with a stirrer and a nitrogen gas inlet. The reactor was heated to 140° C. until the polymer melted. See Malmstrom, E., Johansson, M., and Hult, A., Macromolecules, 28, 1698–1703 (1995). To the continuously stirred molten polymer was added 25 weight % of stearic acid, which is 3.2 mole equivalents of the polymer or 10 mole % of the polymer's free hydroxyl groups. The mixture was left to react with continuous stirring and frequent addition of xylene to facilitate azeotropic water removal. A continuous nitrogen stream was blown through the reactor throughout the reaction time to facilitate the removal of the xylene/water azeotrope. After 2 hours of reaction, the nitrogen was turned off and the reactor was connected to a vacuum to remove any small molecules and volatiles. The remaining viscous brown liquid solidified as it was left to cool to room temperature. An approximately 100% yield was obtained.

150 grams of the solidified stearyl derivative of the 3rd generation polyester polyol from the above reaction was mixed with an equal weight of diglyme in a 3-neck flask equipped with a stirrer, condenser, and a nitrogen gas inlet. The mixture was heated to 100° C. until the solid dissolved to form a clear solution. To the clear solution was added 63 weight % of succinic anhydride (1equivalent of the remaining free —OH groups) followed by 2 weight %, based on total solid charge, of 1,8-diazabicyclo [5.4.0] undec-7-ene (DBU) (1 to 2 moles). The mixture was continuously stirred at 100° C. for 36 hrs. Then the clear liquid was coagulated in excess of hexanes at ambient temperature (25° C.). The resulting yellow paste was washed several times with warm hexanes (45 to 50° C.) to ensure the removal of any unreacted anhydride. The resulting residue was air dried for 48 hours then further dried at 60° C. under vacuum for 24 hours. The resulting solids (the functionalized hyperbranched polymer preparation) was dissolved in water and neutralized by the addition of a sufficient amount of aqueous ammonia to react with any unreacted hydroxyl groups. A 30–40 weight % solution of the solids was thus prepared. Sufficient aqueous ammonia was added to the solution to bring the pH to 9–10.

300 grams of a quinacridone magenta pigment available under the trade name SUNFAST Magenta Presscake 428-

5024 (40.5% solids) from Sun Chemical Corp., Cincinnati, Ohio. was suspended in a mixture of 100 g of DEG and 550 g of water. 73 grams of a 24.7 weight % solution of Dispersant B (18 g solids) was added, followed by 10 g of TRITON X-100. The resulting mixture was subjected to grinding in a Hill mixer for 3 hours at approximately 2000 rpm. Then 42 g of a 36 weight % aqueous solution of the 3-Generation hyperbranched codispersant were added. One hundred grams of water were added and grinding was continued for another hour.

The resulting ink concentrate was subjected to fine particle grinding in an impinging jet process, filtered and further diluted to an approximately 4 weight % solids ink, as described in Example 1.

The ink was thermally stable at 60° C. and 120° C.

The particle size as measured by a Coulter N+submicron particle analyzer ranged between 100 and 150 nm.

The ink was jetted through the printheads of an Encad NOVAJET III wide format printer onto a SCOTCHCAL receptor sheet to yield 30 cm×90 cm magenta prints exhibiting uniform color, no banding, and adhesion to the substrate.

The ink had increased stability and provided better quality printed images, as determined by visual inspection, than the ink of Example 1.

EXAMPLE 3

(Magenta Ink)

20 grams of a quinacridone magenta pigment available under the trade name SUNFAST Magenta Presscake 428-5024 (40.5% solids) from Sun Chemicals was suspended in a mixture of 30 g of DEG and 160 g of water. About 30 g of a 25 weight % solids solution of Dispersant E was added. The resulting mixture was ground for 2 hours in a Hill mixer at approximately 2000 rpm. To this mixture was added 19.5 g of a 38 weight % solids aqueous solution of a 5-Generation hyperbranched polymer (providing 7.4 g solids), prepared in the same manner as the 3-Generation dendritic polymer of Example 2 except the starting material was a 5-Generation polyol available under the trade name BOLTORN H50 from Perstorp Polyol Inc., Toledo, OH, and the 25 weight % (50 g) of stearic acid provided 3 to 4 mole equivalents of the polymer. Grinding was continued for another hour, then the mixture was diluted with 12.5 weight % DEG aqueous solution to an approximately 4 weight % solids ink.

The ink was thermally stable at 60° C.

EXAMPLE 4

(Magenta Ink)

A 4 weight % solids ink concentrate in a 12.5% DEG aqueous solution was prepared in the same manner as Example 3, except the ink concentrate was made with: 20 g of the magenta pigment; approximately 200 g of a 12.5 weight % aqueous solution of DEG; approximately 30 g of a 25% solution of Dispersant F (7.5 g of solids); 2 g of TRITON X-100; 6.6 g of the 38% solution of 3-Generation dendritic polymer (2.5 g of solids).

The ink was thermally stable at 60° C.

EXAMPLE 5

(Cyan Ink)

Twenty-seven grams of a copper phthalocyanine cyan pigment available under the trade name SUNFAST Cyan Presscake 499-1281 (36% solids) from Sun Chemical and 18 g of a 25% solution of Dispersant H (4.5 g of solids) were suspended in a mixture of 27 g of DEG and 160 g of water. Two grams of an acetylenic diol—anionic surfactant blend (serving as a grinding aid/surfactant) available under the trade name SURFYNOL CT-136 from Air Products, Allentown, Pa. were added. This mixture was subjected to high shear grinding in a Hill mixer for 2 hours at approximately 2000 rpm. Then 6.6 g of a 38% solids solution of the 3-Generation dendritic polymer solution described in Example 2 were added (providing 2.5 g of solids). Grinding was continued for another hour to obtain an approximately 15 weight % solids ink concentrate.

The ink concentrate was thermally stable at 60° C.

EXAMPLE 6

(Cyan Ink)

Example 6 was prepared in the same manner as Example 5 except Dispersant G was used instead of Dispersant H.

The ink concentrate was thermally stable at 60° C.

EXAMPLE 7

(Magenta Ink)

60 grams of a quinacridone magenta pigment available under the trade name SUNFAST Magenta Presscake 428-5024 (35.4% solids) from Sun Chemicals was suspended in a mixture of 90 g of DEG and 480 g of water. 5 g of TRITON X-100 were added. About 12 g of a 25 weight % solids solution of Dispersant E was added, followed by 30 g of a 25% weight solids solution of a dispersant identified in copending application U.S. Ser. No. 08/216,161 (Attorney Docket No. 54278USA3A) as Dispersant A. The resulting mixture was ground for 2 hours in a Hill mixer at approximately 2000 rpm. To this mixture was added 19.5 g of a 38 weight % solids aqueous solution of a 5-Generation hyperbranched polymer (providing 7.4 g solids), prepared in the same manner as the 3-Generation dendritic polymer of Example 2 except the starting material was a 5-Generation polyol available under the trade name BOLTORN H50 from Perstorp Polyol Inc., Toledo, Ohio., and the 25 weight % (50 g) of stearic acid provided 3 to 4 mole equivalents of the polymer. Grinding was continued for another hour, then the mixture was diluted with 12.5 weight % DEG aqueous solution to an approximately 4 weight % solids ink.

The ink was thermally stable at 60° C. and 120° C.

The particle size as measured by a Coulter N+submicron particle analyzer was approximately 70 nm.

Other embodiments of the invention are within the scope of the following claims.

What is claimed is:

1. A water-based pigmented ink comprising a suspension of:

a) pigment particles, and b) a dispersant for dispersing hydrophobic particles in an aqueous system comprising a nonpolymerized hydrophobic segment comprised of a hydrocarbon moiety that can adsorb to hydrophobic surfaces, which hydrophobic segment is joined by a chain transfer agent to at least one terminal hydrophilic segment comprised of a polyelectrolyte.

2. The ink of claim 1 wherein the polymeric hydrophilic segment of the dispersant comprises a homopolymer.

3. The ink of claim 1 wherein the polymeric hydrophilic segment of the dispersant comprises a random copolymer.

4. The ink of claim 1 wherein the hydrocarbon moiety of the dispersant comprises between 8 and 20 carbon atoms.

5. The ink of claim 1 wherein the dispersant has a number average molecular weight of 15,000 to 35,000.

6. The ink of claim 1 wherein the hydrophilic segment of the dispersant comprises a copolymer comprising 2-acrylamido-2-methyl-1-propanesulfonic acid and N,N-dimethylacrylamide monomers.

7. The ink of claim 1 wherein the hydrophilic segment of the dispersant comprises a polymer comprising 2-acrylamido-2-methyl-1-propanesulfonic acid and sulfopropyl acrylate potassium salt monomers.

8. The ink of claim 1 wherein the hydrophobic segment of the dispersant comprises a chain transfer agent comprising an aliphatic or aromatic moiety.

9. The ink of claim 8 wherein the chain transfer agent is selected from the group consisting of isooctyl mercaptopropionate, n-tetradecylmercaptan, tri(3-mercaptopropionate), n-octyl mercaptan, and tetra(3-mercaptopropionate).

10. The ink of claim 1 wherein the hydrophobic segment of the dispersant comprises a hydrocarbon moiety having two opposite ends and wherein a polyelectrolyte is attached to each end of the hydrocarbon moiety.

11. The ink of claim 1 further comprising a second dispersant comprising a multi-branched hydrophilic (co) polymer.

12. The ink of claim 11 wherein the dispersants are prepared by copolymerizing 2-acrylamido-2-methyl-1-propanesulfonic acid and N,N-dimethylacrylamide in the presence of monofunctional chain transfer agent n-octyl mercaptan and a multifunctional chain transfer agent selected from the group consisting of trimethylopropane tri(3-mercaptoproprionate) and pentaerythritol tetra (3-mercaptoproprionate).

13. The ink of claim 12 wherein the weight % ratio of multi- to mono- functional chain transfer agents is 2:1 to 2.5:1.

14. The ink of claim 11 wherein the dispersants are prepared by copolymerizing 2-acrylamido-2-methyl-1-propanesulfonic acid and sulfopropyl acrylate potassium salt in the presence of n-octyl mercaptan and a chain transfer agent selected from the group consisting of trimethylopropane tri(3-mercaptoproprionate) and pentaerythritol tetra (3-mercaptoproprionate).

15. The ink of claim 14 wherein the weight % ratio of multi- to mono- functional chain transfer agents is 2:1 to 2.5:1.

16. The water-based pigmented ink of claim 1 further comprising a co-dispersant.

17. The water-based pigmented ink of claim 1 wherein the co-dispersant comprises a derivatized dendritic polymer further comprising at least one ionizable moiety and at least one peripheral nonpolymerized hydrophobic hydrocarbon moiety.

18. The water-based pigmented ink of claim 17 wherein the dendritic polymer is a hyperbranched polyol.

19. The water-based pigmented ink of claim 1 wherein the pigment particles and dispersant molecules form particle/dispersant composites having diameters of less than 250 micrometers.

20. The water-based pigmented ink of claim 1 wherein the pigment is selected from the group consisting of black, yellow, magenta, cyan, red, blue, green, and white pigments.

21. The water-based pigmented ink of claim 20 wherein the black pigment comprises a carbon black pigment.

22. The water-based pigmented ink of claim 20 wherein the yellow pigment comprises a nickel azo pigment.

23. The water-based pigmented ink of claim 20 wherein the cyan pigment comprises a copper phthalocyanate pigment.

24. The water-based pigmented ink of claim 20 wherein the magenta pigment comprises a quinacridone pigment.

* * * * *

UNITED STATES PATENT AND TRADEMARK OFFICE
CERTIFICATE OF CORRECTION

PATENT NO. : 6,395,804 B1
DATED : May 28, 2002
INVENTOR(S) : Rao, Prabhakara S.

It is certified that error appears in the above-identified patent and that said Letters Patent is hereby corrected as shown below:

Column 7,
Line 2, "(e.g., n-octyhnercaptan)" should read -- (e.g., n-octylmercaptan) --.
Line 8, "1, 2; 3 or 4" should read -- 1, 2, 3 or 4 --.

Column 8,
Line 60, "fingicides" should read -- fungicides --.

Column 10,
Line 3, "The was" should read -- The ink was --.

Signed and Sealed this

Seventh Day of January, 2003

JAMES E. ROGAN
*Director of the United States Patent and Trademark Office*